United States Patent [19]
Suresh et al.

[11] Patent Number: 5,877,108
[45] Date of Patent: Mar. 2, 1999

[54] PERFORMANCE OF USED MOLYBDENUM BASED CATALYSTS BY THE ADDITION OF AMMONIUM DIMOLYBDATE

[75] Inventors: Dev Dhanaraj Suresh, Hudson; Christos Paparizos, Willowick; Michael J. Seely; Tama Lee Drenski, both of Twinsburg; Maria Strada Friedrich, Lyndhurst, all of Ohio

[73] Assignee: The Standard Oil Company, Cleveland, Ohio

[21] Appl. No.: 988,589

[22] Filed: Dec. 11, 1997

[51] Int. Cl.$^6$ .............................. B01J 20/34; B01J 23/90
[52] U.S. Cl. ................................. 502/20; 502/26; 502/54
[58] Field of Search .................................. 502/20, 22, 26, 502/54

[56] References Cited

U.S. PATENT DOCUMENTS

| | | | |
|---|---|---|---|
| 3,755,148 | 8/1973 | Mickelson et al. | 252/435 |
| 4,425,255 | 1/1984 | Toyoda et al. | 502/38 |
| 4,609,635 | 9/1986 | Canavesi et al. | 502/26 |
| 4,916,102 | 4/1990 | Janssen et al. | 502/211 |

*Primary Examiner*—Gary P. Straub
*Assistant Examiner*—Alexander G. Ghyka
*Attorney, Agent, or Firm*—Michael F. Esposito; David J. Untener

[57] ABSTRACT

A process for regenerating molybdenum containing ammoxidation catalyst comprising replacing the molybdenum loss from the catalyst during the ammoxidation reaction wherein ammonium dimolybdenum is utilized as the source for replacement of the molybdenum loss from the original catalyst.

3 Claims, No Drawings

PERFORMANCE OF USED MOLYBDENUM BASED CATALYSTS BY THE ADDITION OF AMMONIUM DIMOLYBDATE

BACKGROUND OF THE INVENTION

Field of the Invention

This present invention relates to a method of regeneration of mixed metal oxide catalyst. In particular, the present invention is directed to the regeneration of bismuth-moly-iron-promoted mixed metal oxide catalyst useful in the ammoxidation of propylene to acrylonitrile.

Mixed metal oxide based supported catalysts which are active in ammoxidation reactions, particularly in the production of acrylonitrile or methacrylonitrile from propylene or isobutylene, ammonia and oxygen are known in the art. A typical mixed metal oxide catalyst suitable for ammoxidation contains molybdenum, bismuth and iron promoted with various metals. It has been observed that the activity of such catalyst declines as a result of prolonged exposure to ammoxidation conditions and this decline, which manifests itself as a reduction in the yield of useful reaction products given by the catalyst, is accompanied by a partial loss of molybdenum. Typically, when the yield of acrylonitrile with respect to propylene conversion is reduced by five or more percentage units compared with the value of a fresh catalyst, the ammoxidation catalyst is spent and needs regeneration.

Several methods have been proposed in the art for the regeneration of spent ammoxidation catalyst. For example, see U.S. Pat. Nos. 3,882,159; 4,052,332; 4,757,038; 4,536,483; and 4,425,255. Each of these patents discloses various means of regeneration of ammoxidation catalyst. In addition, German Patent No. 3,311,521 also discloses a regeneration procedure for ammoxidation catalyst. Of the foregoing patents, U.S. Pat. Nos. 4,425,255, 4,609,635 and 4,052,332, as well as German Patent 3,311,521 each are concerned with regeneration of bismith-molybdenum-iron-containing catalyst promoted with various other elements. U.S. Pat. No. 3,882,159 discloses a regeneration procedure which includes adding molybdenum oxide on an inert support to the catalyst for regeneration. U.S. Pat. No. 4,609,635 discloses that the catalyst may be regenerated using aqueous ammonium molybdate, in particular, ammonium heptamolybdate to add molybdenum to the catalyst. A similar teaching with the addition of molybdenum trioxide and ammonium heptamolybdate can be seen in German Patent 3,311,521 as well as the U.S. Pat. No. 4,425,255. Generally, each of the references discloses that the regeneration of the promoted bismuth, iron, molybdenum catalyst system requires the replacement of molybdenum onto the catalyst.

SUMMARY OF THE INVENTION

It is the primary object of the present invention to provide a novel procedure for regeneration of a molybdenum containing ammoxidation catalyst. It is another object of the present invention to provide a novel procedure for the regeneration of a bismuth, iron, molybdenum catalyst promoted with various other metals.

Additional objects and advantages of the invention will be set forth in part in the description that follows, and, in part, will be obvious from the description or may be learned by practicing the invention. The objects and advantages of the invention may be realized and obtained by means of the instrumentalities and combinations particularly pointed out in the appended claims.

To achieve the foregoing objects in accordance with the purpose of the present invention as embodied and broadly described herein, the process of the present invention comprises regenerating an ammoxidation catalyst containing molybdenum as an active component comprising treating the catalyst to replace the molybdenum lost from the catalyst during its use in an ammoxidation reaction of propylene, ammonia and the air to produce acrylonitrile wherein the improvement comprises selecting ammonium dimolybdate as the source for the molybdenum being added to the original catalyst to replace the molybdenum lost from the original catalyst.

In a preferred embodiment of the present invention, the molybdenum-containing catalyst is represented by the following empirical formula:

$$A_a B_b C_c D_d Bi_e Mo_f O_x$$

where

A = one or more of Li, Na, K, Cs, Rb, Sm, In, Ca, Sr, Ba and Tl, preferably K, Cs, and Na B = one or more of Fe, Co, Mg, Mn, Ni, V and Zn, preferably Fe, Co, Ni, Mg and Mn C = one or more of Cr, Ce, Eu, P, Sb, Ge, Te and W, preferably Cr, Ce, P and Ge D = one or more of Sn, B, As, Pt, Pd, Ga, Nd, Pr and Pb, and a = 0.05–3.0, preferably 0.1 to 1.0 b = 4.0–14.0, preferably 4.0 to 12.0 c = 0.0–5.0 d = 0.0–2.0 e = 0.2–6.0 f = 8.0–18.0, preferably 10.0 to 16.0 and the value of x depends on the oxidation states and amounts of elements used.

The process of the present invention may be practiced with any ammoxidation catalyst containing molybdenum. For example, catalysts such as those are disclosed in U.S. Pat. Nos. 4,425,255, 3,642,930, 4,609,635 and 5,093,299, herein incorporated by reference.

DETAILED DESCRIPTION OF THE INVENTION

Reference will now be made in detail to the present preferred embodiments of the present invention.

The process of the present invention is directed to regeneration of an ammoxidation catalyst containing molybdenum as an active component comprising subjecting the catalyst which has been utilized in an ammoxidation reaction to treatment with ammonium dimolybdate. The ammonium dimolybdate replenishes the catalyst with molybdenum which has been lost during the ammoxidation procedure.

In particular, the present invention is directed to the regeneration of ammoxidation catalyst characterized as having the following empirical formula:

$$A_a B_b C_c D_d Bi_e Mo_f O_x$$

where

A = one or more of Li, Na, K, Cs, Rb, Sm, In, Ca, Sr, Ba and Tl

B = one or more of Fe, Co, Mg, Mn, Ni, V and Zn

C = one or more of Cr, Ce, Eu, P, Sb, Ge, Te and W

D = one or more of Sn, B, As, Pt, Pd, Ga, Nd, Pr and Pb, and a=0.05–3.0, preferably 0.1 to 2.0
b=4.0–14.0, preferably 4.0 to 12.0
c=0.0–5.0
d=0.0–2.0
e=0.2–6.0
f=8.0–18.0 and the value of x depends on the oxidation states and amounts of elements used.

Typically, these catalysts can be either supported or unsupported with supports like silica, alumina, zirconia, titanium and their combinations. However, silica is preferred.

In each of the examples set forth below, the same catalyst composition $K_{0.1}Ni_{2.5}Co_{4.5}Fe_{3.0}Bi_{1.0}P_{0.5}Mo_{12}O_x$ was utilized. The ammoxidation reaction was performed in a 40 cc fluid bed reactor under identical reactor conditions which were Feed: $1C_3^=/1.15NH_3/2.12O_2/4.02N_2$
Temperature: 438° C.
Contact Time: 5.2 seconds
WWH: 0.06
Pressure: atmospheric

TABLE I

| Example | Additive | % $C_3$ = conv | % AN Yld | % AN Sel | # Hrs |
|---|---|---|---|---|---|
| 1 | None | 98.9 | 72.7 | 73.6 | 23.5 |
| 2 | $MoO_3$ | 98.9 | 75.7 | 76.6 | 21.0 |
| 3 | AHM | 97.7 | 75.5 | 77.2 | 22.0 |
| 4 | ADM | 98.4 | 75.9 | 77.1 | 22.5 |

As can be seen from the results set forth in Table I, the use of ammonium dimolybdate achieves substantially the same selectivity with an improved acrylonitrile yield and the attendant benefit of being substantially more economical compared to $MoO_3$ or AHM addition.

While the invention has been described in connection with the preferred embodiments, it will be understood that it is not intended to limit the invention to those embodiments. On the contrary, it is intended to cover all alternatives, modifications and equivalents as may be included within the scope of the invention defined by the appended claims.

What we claim as our invention is:

1. A process for regenerating an ammoxidation catalyst containing molybdenum as an active component comprising treating the catalyst to replace the molybdenum loss during the catalyst use in an ammoxidation reaction to produce acrylonitrile wherein the improvement comprises selecting ammonium dimolybdate as the source for the molybdenum being added to the original catalyst to replace the lost molybdenum.

2. The process of claim 1 wherein the molybdenum containing catalyst is represented by the following formula:

$$A_aB_bC_cD_dBi_eMo_fO_x$$

where

A=one or more of Li, Na, K, Cs, Rb, Sm, In, Ca, Sr, Ba and Tl
B=one or more of Fe, Co, Mg, Mn, Ni, V and Zn
C=one or more of Cr, Ce, Eu, P, Sb, Ge, Te and W
D=one or more of Sn, B, As, Pt, Pd, Ga, Nd, Pr and Pb, and
a=0.05–3.0
b=4.0–14.0
c=0.0–5.0
d=0.0–2.0
e=0.2–6.0
f=8.0–18.0 and the value of x depends on the oxidation states and amounts of elements used.

3. The process of claim 2 where A is at least one element selected from K, Cs and Na.

* * * * *